United States Patent
Taketani et al.

(10) Patent No.: US 6,168,639 B1
(45) Date of Patent: Jan. 2, 2001

(54) SOLID ELECTROLYTE CAPACITOR, AND PROCESS AND APPARATUS FOR PRODUCING SAME

(75) Inventors: Yutaka Taketani, Daito; Kakusyo Yoshida, Osaka; Hidenori Kamigawa, Higashiosaka; Yasuhiro Kishimoto, Suita; Youichi Kojima; Takeshi Takamatsu, both of Daito, all of (JP)

(73) Assignees: Sanyo Electric Co., Ltd.; Sanyo Electronic Components Co., Ltd., both of Osaka (JP)

( * ) Notice: Under 35 U.S.C. 154(b), the term of this patent shall be extended for 0 days.

(21) Appl. No.: 09/166,910

(22) Filed: Oct. 6, 1998

(30) Foreign Application Priority Data

Oct. 9, 1997 (JP) .................................................. 9-276984
Mar. 31, 1998 (JP) ................................................ 10-085379

(51) Int. Cl.⁷ ................................. H01G 9/00; C25D 5/00
(52) U.S. Cl. ........................... 29/25.03; 361/523; 205/80; 205/84
(58) Field of Search ........................... 29/25.03; 361/523; 205/80, 84

(56) References Cited

U.S. PATENT DOCUMENTS

| | | |
|---|---|---|
| 4,780,796 | 10/1988 | Fukuda et al. . |
| 5,071,521 | * 12/1991 | Komjima et al. ..................... 205/153 |
| 5,473,503 | * 12/1995 | Sakata et al. ......................... 361/525 |

FOREIGN PATENT DOCUMENTS

| | | |
|---|---|---|
| 3-65009 | 3/1989 | (JP) . |
| 4-23410 | 4/1992 | (JP) . |
| 4-67767 | 10/1992 | (JP) . |
| 5-83167 | 11/1993 | (JP) . |

OTHER PUBLICATIONS

Unexamined Japanese Patent Publication HEI. 5–283,289, dated Oct. 29, 1993.

Unexamined Japanese Patent Publication HEI. 5–121,173, dated May 18, 1993.

* cited by examiner

*Primary Examiner*—John F. Niebling
*Assistant Examiner*—Ha Tran Nguyen
(74) *Attorney, Agent, or Firm*—Armstrong, Westerman, Hattori, McLeland & Naughton

(57) ABSTRACT

The invention provides a process for producing solid electrolyte capacitors by forming a dielectric oxide film and a first cathode layer of solid conductive substance over the surface of an anode body of valve metal, and forming a second cathode layer of conductive high polymer on the first cathode layer by electrolytic oxidative polymerization. In forming the second cathode layer, the pH of the electrolyte to be used for electrolytic oxidative polymerization is maintained within a predetermined range by adding an acid or alkali to the electrolyte. Since the pH of the electrolyte remains substantially unaltered by the polymerization according to the invention, the electrolyte is repeatedly usable while permitting the resulting second cathode layers to retain the desired electric conductivity. The second cathode layer is formed by immersing in the electrolyte the anode body formed over the surface thereof with the oxide film and the first cathode layer, feeding a positive voltage with an external electrode piece in contact with the first cathode layer in the electrolyte, and shifting the feeding point at a predetermined time interval. The feeding point where the electrode piece is in contact with the first cathode layer for feeding shifts during the step of electrolytic oxidative polymerization, so that the thickness of the second cathode layer formed as centered about the feeding point is made uniform to the greatest possible extent over the entire anode body without increasing locally.

7 Claims, 3 Drawing Sheets

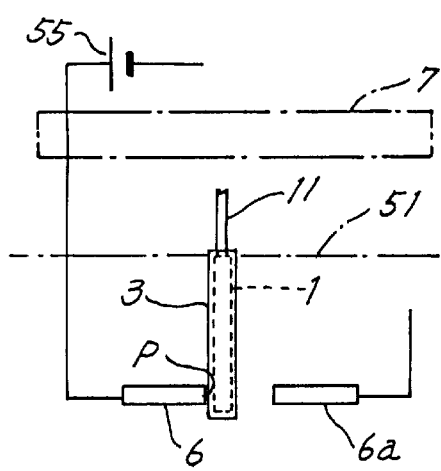
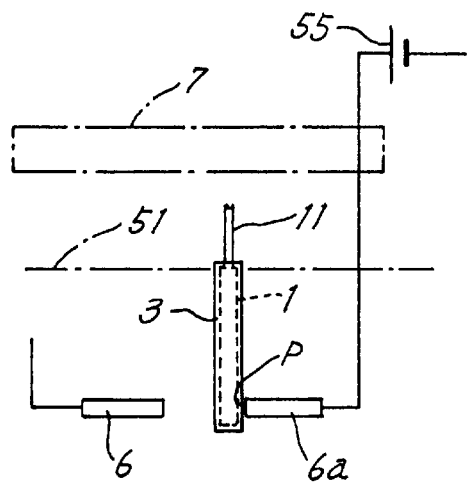
FIG. 3(A)   FIG. 3(B)
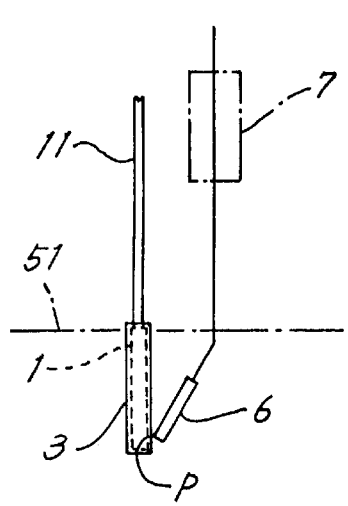
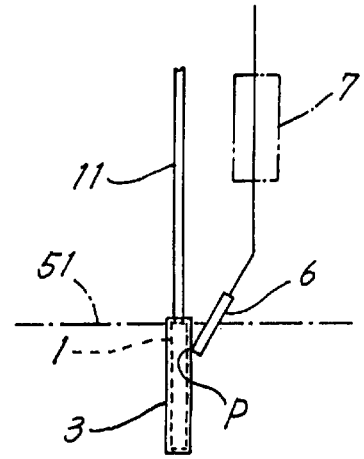
FIG. 4(A)   FIG. 4(B)

SOLID ELECTROLYTE CAPACITOR, AND PROCESS AND APPARATUS FOR PRODUCING SAME

FIELD OF THE INVENTION

The present invention relates to solid electrolyte capacitors having a cathode layer of electrically conductive high polymer, and to a process and an apparatus for producing such capacitors. More particularly, the invention relates to improvements in a process for producing solid electrolyte capacitors wherein the cathode layer is prepared from a conductive high polymer by electrolytic oxidative polymerization.

BACKGROUND OF THE INVENTION

Solid electrolytic capacitors comprise an anode body of a valve metal such as Al (aluminum) or Ta (tantalum), a dielectric oxide film formed on the surface of the anode body by an electrolytic oxidation treatment, and a cathode layer formed by applying an electrically conductive substance, such as electrolyte, $MnO_2$ (manganese dioxide) or conductive organic compound, to the oxide film in intimate contact therewith. The term the "valve metal" as used herein refers to a metal which forms a highly compacted durable dielectric oxide film when subjected to an electrolytic oxidation treatment. Such metals include Ti (titanium) and Nb (niobium) in addition to Al and Ta. Since the dielectric oxide film has a very small thickness, electrolytic capacitors have the advantage that they can be smaller in size and greater in capacity than other paper capacitors and film capacitors.

Electrolytic capacitors wherein a solid conductive substance, such as $MnO_2$ or conductive organic compound, is used for the cathode layer are called solid electrolyte capacitors. Examples of such conductive organic compounds are polypyrrole, polyaniline and like conductive high polymers, and TCNQ (7,7,8,8,-tetracyanoquinodimethane) complex salts.

These conductive organic compounds are higher than electrolytes and $MnO_2$ in electric conductivity. Accordingly, the solid electrolyte capacitors wherein the conductive organic compound is used for the cathode layer are lower in ESR (equivalent series resistance) and more excellent in high-frequency characteristics than when an electrolyte or $MnO_2$ is used for the cathode layer. These capacitors are presently used in various electronic devices.

As a process for preparing the cathode layer from the conductive high polymer among the above-mentioned conductive organic compounds, it is known to utilize chemical oxidative polymerization or electrolytic oxidative polymerization. Chemical oxidative polymerization is a process wherein a monomer is oxidatively polymerized with use of an oxidizing agent to prepare a high polymer. Electrolytic oxidative polymerization is a process wherein an oxidation reaction occurring on the anode in electrolysis is utilized to subject a monomer to oxidative polymerization and form a high polymer on the anode.

The process resorting to chemical oxidative polymerization comprises applying an oxidizing agent to the dielectric oxide film, and bringing the oxidizing agent into contact with a solution or gas of the monomer to be made into a conductive high polymer to oxidatively polymerize the monomer, whereby a conductive high-polymer layer is formed on the dielectric oxide film. However, the conductive high-polymer layer formed by this process has the drawback of being low in strength, liable to develop irregularities and lower in electric conductivity than the conductive high-polymer layer formed by electrolytic oxidative polymerization. The process therefore fails to provide a cathode layer which is fully satisfactory for use in high-performance solid electrolyte capacitors.

On the other hand, electrolytic oxidative polymerization, when resorted to, generally affords a uniform conductive high-polymer layer having a high strength, high electric conductivity and satisfactory quality, whereas when the conductive high-polymer layer is to be formed directly on the dielectric oxide film by electrolytic oxidative polymerization, the oxide film, which is an insulator, fails to function as an anode, making it impossible or extremely difficult to form the high-polymer layer on the oxide film.

Accordingly, it has been proposed to form a first cathode layer on the dielectric oxide film by a process other than electrolytic oxidative polymerization and to subsequently effect electrolytic oxidative polymerization with the first cathode layer serving as an anode to thereby form a second cathode layer of conductive high polymer on the first cathode layer.

JP-B-74853/1992 filed for Japanese patent application by Japan Carlit Co., Ltd. (U.S. Pat. No. 4,780,796 with priority claim based on the patent application), and JP-B-65009/1991 and JP-B-23410/1992 of the same company, and JP-B-83167/1993 filed for Japanese patent application by Nippon Chemi-Con Corp. disclose solid electrolyte capacitors wherein a conductive high-polymer layer is formed as the first cathode layer by chemical oxidative polymerization. JP-B-67767/1992 filed for Japanese patent application by Matsushita Electric Industrial Co., Ltd. discloses a solid electrolyte capacitor having an $MnO_2$ layer as the first cathode layer. Japanese Patent Application 164019/1997 not laid open and filed conjointly by Sanyo Electric Co., Ltd. and Sanyo Electronic Components Co., Ltd., the assignee of the present patent application, discloses a solid electrolyte capacitor wherein a layer of TCNQ complex salt is formed as the first cathode layer.

FIG. 6 shows the common step of forming a second cathode layer from a conductive high polymer on the first cathode layer by electrolytic oxidative polymerization. An electrolyte 51 is placed in an electrolytic bath 50. The electrolyte 51 contains a monomer capable of forming a conductive high polymer, and a supporting electrolyte for giving a desired electric conductivity to the electrolyte 51. An anode body 1 formed with a dielectric oxide film and a first cathode layer is immersed in the electrolyte 51. Next, an external electrode 9 is held in contact with the first cathode layer 3 of the anode body 1, and a positive voltage is fed to the external electrode 9. The positive voltage is fed to the first cathode layer 3 in contact with the external electrode 9, causing an oxidation reaction, whereby the monomer is oxidatively polymerized into a conductive high polymer. Thus, the second cathode layer of conductive high polymer is formed on the first cathode layer 3.

In producing solid electrolyte capacitors actually, a multiplicity of anode bodies 1 are immersed in the electrolyte 51 as one lot and subjected to electrolytic oxidative polymerization at the same time to form the second cathode layer on each anode body. When anode bodies 1 are subsequently subjected to electrolytic oxidative polymerization as another lot, it has been found that the electrolytic capacitors of the subsequent lot are higher in ESR and lower in high-frequency characteristics than those of the previous lot. For this reason, it is conventional practice to replace the electrolyte by a fresh one every time the polymerization operation is conducted for one lot of anode bodies 1. This entails an impaired operation efficiency and an increased cost.

Further when a current is fed through the external electrode 9 in contact with the first cathode layer 3 for electrolytic oxidative polymerization, the current density fails to remain constant depending on the degree of contact between the electrode 9 and the first cathode layer 3, presenting difficulty in forming a uniform second cathode layer. Moreover, when the external electrode 9 is removed after the second cathode layer has been formed, the second cathode layer becomes dislodged locally, causing damage to the dielectric oxide film at the same time and creating problems such as increased leakage current from the capacitor.

To avoid such problems, JP-A-283289/1993 filed for Japanese patent application conjointly by Elna Co., Ltd. and Asahi Glass Co., Ltd. discloses an external electrode 9 having a curved end 91 for use in feeding by contact with the first cathode layer 3. The electrode thus designed precludes a great mechanical stress from acting locally on the anode body 1, obviating the problem that the second cathode layer is partly separated off by the removal of the external electrode 9 on completion of polymerization.

The electrode thus designed nevertheless has a problem: since the current is fed to the first cathode layer 3 concentrically at a point P, there occurs a potential difference between the region in the vicinity of the feeding point P and a region away from this point, resulting in uneven growth of the second cathode layer in accordance with the potential distribution.

An object of the present invention is to provide a process for producing electrolytic capacitors wherein the electrolyte is repeatedly usable for electrolytic oxidative polymerization to form second cathode layers having a constant electric conductivity free of impairment.

We have found that when electrolytes are checked for pH before and after electrolytic oxidative polymerization, the polymerization greatly varies the pH. This variation is thought attributable to the phenomenon that the conductive high polymer produced is doped with a portion or the whole of the supporting electrolyte. Since the electric conductivity of conductive high polymers are dependent generally on the pH of the polymerization system, we have contrived the means to be described below to accomplish the object.

A second object of the invention useful for producing solid electrolyte capacitors is to improve the step of forming the second cathode layer by electrolytic oxidative polymerization with current fed to the first cathode layer and to provide a process and an apparatus for forming the second cathode layer with a thickness made uniform to the greatest possible extent.

SUMMARY OF THE INVENTION

To fulfill the foregoing objects, the present invention provides a process for producing a solid electrolyte capacitor including the steps of forming a dielectric oxide film on a surface of an anode body made of a valve metal, forming a first cathode layer of a solid electrically conductive substance on the oxide film, and forming a second cathode layer of an electrically conductive high polymer on the first cathode layer by electrolytic oxidative polymerization. The step of forming the second cathode layer includes the step of maintaining the pH of an electrolyte for use in the electrolytic oxidative polymerization within a predetermined range by adding an acid or alkali to the electrolyte.

Since the pH of the electrolyte remains substantially unaltered by the electrolytic oxidative polymerization in this process, the electrolyte once used for the polymerization is subsequently usable for the polymerization while permitting the resulting second cathode layer to have the desired electric conductivity. Accordingly, the same electrolyte is repeatedly usable, consequently achieving an improved operation efficiency and suppressing an increase in production cost.

The present invention also provides a solid electrolyte capacitor comprising an anode body made of a valve metal, a dielectric oxide film formed on a surface of the anode body, a first cathode layer made of an electrically conductive high polymer formed on the oxide film by chemical oxidative polymerization, and a second cathode layer made of an electrically conductive high polymer formed on the first cathode layer by electrolytic oxidative polymerization. The first and second cathode layers contain the same dopant.

With the solid electrolyte capacitor of the present invention, the first and second cathode layers contain the same dopant, which improves the conductivity between the two cathode layers, consequently giving improved ESR characteristics to the capacitor.

The invention also provides a process for producing a solid electrolyte capacitor comprising the steps of immersing in an electrolyte an anode body made of a valve metal and having a surface covered with a dielectric oxide film and a first cathode layer of solid electrically conductive substance, feeding a positive voltage with an external electrode piece in contact with the first cathode layer over the anode body in the electrolyte to form a second cathode layer of electrically conductive high polymer on the first cathode layer by electrolytic oxidative polymerization, and shifting a feeding point of the external electrode piece on the first cathode layer at a predetermined time interval to make the second cathode layer uniform in thickness.

The invention further provides an apparatus for subjecting to electrolytic oxidative polymerization an anode body made of a valve metal and having a surface covered with a dielectric oxide film and a first cathode layer of solid electrically conductive substance to form a second cathode layer of electrically conductive high polymer on the first cathode layer. The apparatus comprises an electrolytic bath for containing an electrolyte, means for supporting the anode body as immersed in the electrolyte in the bath, a plurality of external electrode pieces arranged in the bath and so supported as to be movable into and out of contact with the anode body, and a change-over device coupled to the external electrode pieces for changing over feeding from one of the electrode pieces to the other electrode piece. A feeding point of the electrode piece on the first cathode layer is repeatedly shift by the change-over device.

With the process and apparatus described above for producing solid electrolyte capacitors, the feeding point where the electrode piece is in contact with the first cathode layer for feeding shifts during the step of electrolytic oxidative polymerization, so that the thickness of the second cathode layer formed as centered about the feeding point is made uniform to the greatest possible extent over the entire anode body without increasing locally.

BRIEF DESCRIPTION OF THE DRAWINGS

FIG. 3 includes front views showing a production apparatus according to a second embodiment, (A) and (B) being views showing a feeding point as shifted;

FIG. 4 includes front views showing another production apparatus according to the second embodiment, (A) and (B) being views showing a feeding point as shifted;

DETAILED DESCRIPTION OF THE INVENTION

The present invention will be described below in greater detail.

Embodiment 1

Figure 1:
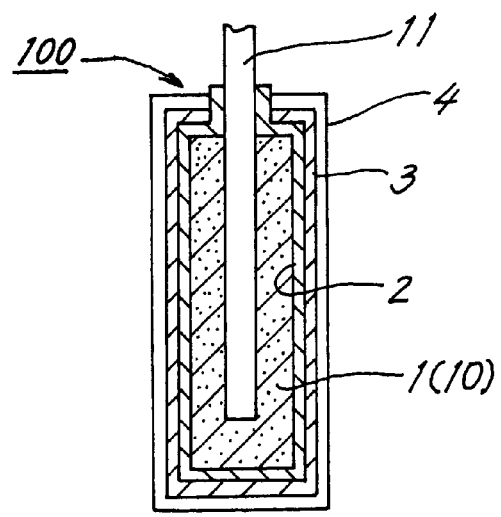
FIG. 1 is a sectional view showing the structure of a known capacitor element which is the main portion of a solid electrolyte capacitor.

FIG. 1 shows a known capacitor element 100 which is the main portion of a solid electrolyte capacitor and which comprises an anode body 1 made of a valve mental such as Al or Ta. An anode lead wire 11 is welded or adhered to the anode body 1, and the anode body 1 and a portion of the lead wire 11 are treated by electrolytic oxidation over the surfaces thereof to form a dielectric oxide film 2. The oxide film 2 is formed with a first cathode layer 3, on which a second cathode layer 4 of electrically conductive high polymer is formed by electrolytic oxidative polymerization. A carbon layer and a silver paste layer are formed over the second cathode layer 4 of the capacitor element 100 thus prepared, a metal terminal plate is attached to each of the anode lead wire 11 and the silver paste layer, and the assembly is encapsulated with an epoxy resin or the like, followed by aging, to complete a solid electrolyte capacitor.

The anode body 1 is the form of a metal foil or sintered metal body. The metal foil is rough-surfaced by etching and thereby given an increased surface area. The sintered metal body is prepared by sintering a particulate metal and is porous. In the case where the sintered metal body is used as the anode body 1, the dielectric oxide film 2 and the cathode layers 3, 4 are formed over the outer surface thereof and also inside the pores. Sintered bodies 10 of Ta serving as a valve metal are used in Example and Comparative Example to be given below.

Electrically conductive organic compounds such as conductive high polymers and TCNQ complex salts, or electrically conductive inorganic compounds such as manganese dioxide are usable for forming the first cathode layer 3. Polypyrrole which is a conductive high polymer is used for forming the layer 3 and prepared by chemical oxidative polymerization in Example and Comparative Example to be given later.

Polypyrrole, polyaniline, polythiophene, polyfuran and derivatives of these polymers are usable for forming the second cathode layer 4 of conductive high polymer. Polypyrrole is used in Example and Comparative Example to be given later.

Conductive high polymers exhibit metallic properties and are remarkably increased in electric conductivity when doped with a suitable substance in the interior. In the case of solid electrolyte capacitors wherein conductive high polymers are used for the cathode layer, the conductive high polymer is generally doped with a suitable substance. The substance to be used for doping is termed a "dopant."

To form the first cathode layer 3 by chemical oxidative polymerization, the anode body 1 formed with the dielectric oxide film 2 is first dipped in a solution containing an oxidizing agent and a doping agent for giving the dopant, or sprayed or coated with the solution, whereby the oxidizing agent and the doping agent are applied to the oxide film 2 on the anode body.

Usable as the oxidizing agent is any of those generally known, such as halogens and peroxides.

Examples of useful doping agents are protonic acids including sulfuric acid and nitric acid, and surfactants such as alkylsulfonic acid salts. Examples of other compounds useful as doping agents are described in detail in JP-B-83167/1993 mentioned above, and other literature (e.g., K. Yoshino and M. Onoda, "Polymer Electronics," Corona Publishing Co., Ltd., 1996).

An element or compound (such as halogen, transition metal halide or protonic acid) which is serviceable as an oxidizing agent and also as a doping agent may be made into a solution, and the solution need not contain two kinds of compounds serving as oxidizing agent and doping agent, respectively.

Next, a solution or gas of a monomer capable of forming a conductive high polymer is then brought into contact with the anode body 1 thus treated, by dipping, spraying or coating. The monomer is then oxidatively polymerized by the oxidizing agent, forming a cathode layer 3 of conductive high polymer on the dielectric oxide film 2.

Figure 2:
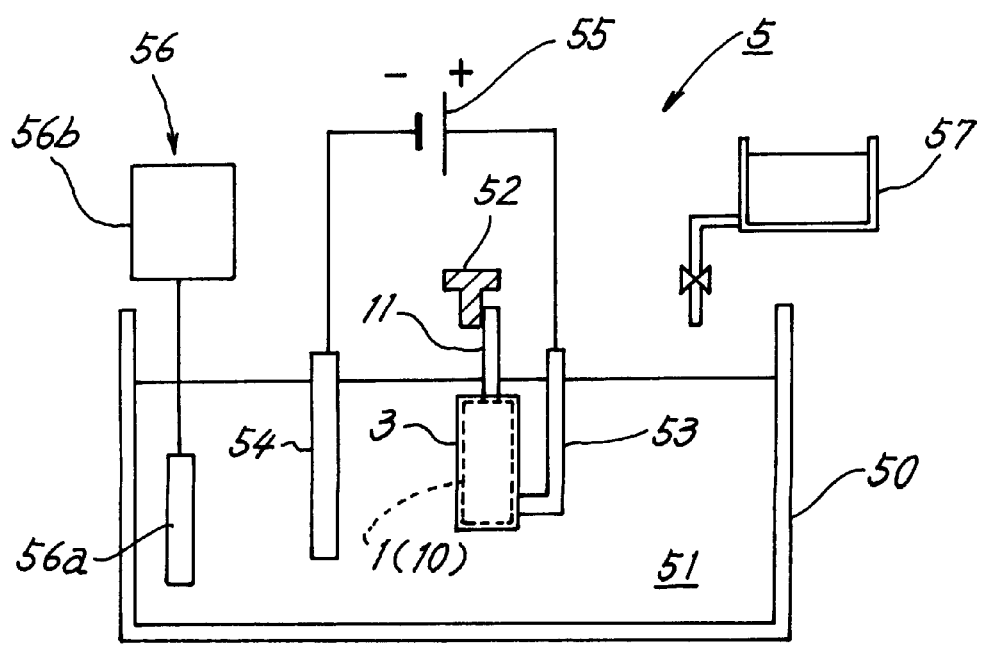
FIG. 2 is a front view showing a production apparatus as a first embodiment.

FIG. 2 shows a production apparatus 5 by which the second cathode layer 4 of conductive high polymer is formed by electrolytic oxidative polymerization on the first cathode layer 3 of the anode body 1 resulting from the above treatment. The apparatus 5 comprises an electrolytic bath 50 containing an electrolyte 51.

The electrolyte 51 contains a monomer capable of forming the conductive high polymer, a supporting electrolyte and other additives. The supporting electrolyte is strongly electrolytic, added to give a desired electric conductivity to the electrolyte 51 and suitably selected in conformity with the monomer and solvent to be used. It is especially desired that the supporting electrolyte be a doping agent serving as the dopant for the conductive high polymer. Used in Example and Comparative Example to be given below are pyrrole insoluble in water and serving as the monomer, water as the solvent, and a sodium alkylnaphthalenesulfonate which is a surfactant and strongly electrolytic and serves as the supporting electrolyte.

Disposed above the electrolyte 51 is a carrier bar 52 for holding a multiplicity of anode bodies 1 treated as stated above and immersing the anode bodies 1 in the electrolyte 51. The anode lead wires 11 of the anode bodies 1 are attached to the carrier bar 52 by welding. The production apparatus 5 generally has many carrier bars 52, and all the anode bodies 1 attached to these carrier bars 52 are subjected to electrolytic oxidative polymerization at the same time as one lot.

Arranged in the electrolyte 51 are a pair of external electrodes 53, 54 for electrolysis. The electrode 53 of the pair is connected to a positive electrode of a power source 55 and positioned so as to contact the first cathode layer 3 of each anode body 1. The other external electrode 54 is connected to a negative electrode of the power source 55. In the following description, the external electrode 53 will be termed the "anode electrode," and the other external electrode 54 the "cathode electrode."

According to the present embodiment, a commercial pH meter 56 is provided for measuring the pH of the electrolyte 51. The pH meter 56 comprises an electrode portion 56a immersed in the electrolyte 51, and a body portion 56b for calculating the pH of the electrolyte 51. Used as the pH meter 56 is Model M-13, a product of Horiba, Ltd.

Further with the present embodiment, there is disposed a supply tank 57 containing an acid or alkali solution for maintaining the electrolyte 51 at the desired pH. In accordance with the pH value measured by the pH meter 56, the acid or alkali solution is suitably supplied from the tank 57 to the electrolytic bath 51. The acid or alkali solution to be used is preferably a doping agent like the supporting electrolyte described above although not limited specifically. The supply tank 57 contains sulfuric acid in Example to follow.

When the apparatus 5 thus constructed is operated with a current fed from the power source 55 to the anode electrode 53 and the cathode electrode 54, electrolysis takes place, causing the monomer to undergo an oxidative polymerization reaction on the anode electrode 53 and the first cathode layer 3 in contact with this electrode 53, whereby a second cathode layer 4 of conductive high polymer is formed.

The present invention will be described below with reference to the following example and comparative example.

a. EXAMPLE

First, sintered bodies 10 of Ta each having an anode lead wire 11 attached thereto were immersed in an aqueous solution of phosphoric acid (0.02 wt % (weight percentage)), and a voltage was impressed on the sintered bodies for electrolytic oxidation to form a dielectric oxide film 2 on the outer surface of each body 10, inside the pores thereof and on the surface of a portion of the lead wire 11.

For chemical oxidative polymerization, an aqueous solution was then prepared which contained hydrogen peroxide (1 mole/liter in concentration) serving as an oxidizing agent and sulfuric acid (0.2 mole/liter in concentration) as a doping agent. The sintered Ta body 10 treated as above was immersed in the aqueous solution for 10 minutes and thereafter exposed to pyrrole monomer for 30 minutes to effect chemical oxidative polymerization, whereby a first cathode layer 3 of polypyrrole was formed on the surface of the dielectric oxide film 2.

For electrolytic oxidative polymerization, an electrolyte 51 was subsequently prepared which contained pyrrole monomer and a supporting electrolyte, i.e., a sodium alkylnaphthalenesulfonate, in water serving as a solvent, and which was adjusted to a pH of 3 with sulfuric acid. As shown in FIG. 2, each sintered Ta body 10 treated as described above was immersed in the electrolyte 51, and a current was fed across the anode electrode 53 and the cathode electrode 54, with the anode electrode 53 in contact with the first cathode layer 3 to effect electrolytic oxidative polymerization, whereby a second cathode layer 4 of polypyrrole was formed on the surface of the first cathode layer 3. During the feeding, the electrolyte 51 was checked for pH by the pH meter 56, and sulfuric acid was suitably added to the bath 50 from the supply tank 57 so as to maintain the electrolyte 51 at a pH of up to 8.

The sintered body was thereafter washed and dried to complete a capacitor element 100, followed by the same steps as previously described to complete a solid electrolyte capacitor.

The measurements obtained in Example were as follows.

The electrolyte 51 as prepared before the electrolytic oxidative polymerization step had an alkylnaphthalenesulfonate ion concentration of 0.06 mole/liter. After performing the electrolytic oxidative polymerization step five times, the electrolyte 51 was 0.051 mole/liter in the sulfonate ion concentration. Thus, the polymerization resulted in only a slight decrease in the ion concentration.

When the completed solid electrolyte capacitors were checked for ESR, the average value was 47 milliohms, the maximum was 51 milliohms and the minimum was 43 milliohms.

b. Comparative Example

In this comparative example, solid electrolyte capacitors were completed in the same manner as in Example except that no sulfuric acid was added to the bath in the electrolytic oxidative polymerization step. This production process is the same as the conventional process.

Stated more specifically, prepared for electrolytic oxidative polymerization was an electrolyte 51 containing pyrrole monomer and a supporting electrolyte, i.e., a sodium alkylnaphthalenesulfonate, in water serving as a solvent. Sintered Ta bodies 10 treated as described above were immersed in the electrolyte 51, and a current was fed across the anode electrode 53 and the cathode electrode 54, with the anode electrode 53 in contact with the first cathode layer 3 of each sintered body 10 to effect electrolytic oxidative polymerization, whereby a second cathode layer 4 of polypyrrole was formed on the surface of the first cathode layer 3.

Comparative Example gave the following measurements.

The electrolyte 51 as prepared before the electrolytic oxidative polymerization step had an alkylnaphthalenesulfonate ion concentration of 0.06 mole/liter, which was the same value as in Example. The pH of the electrolyte 51 was about 7. After performing the electrolytic oxidative polymerization step once, the electrolyte 51 was 0.052 mole/liter in the sulfonate ion concentration. The decrease in the ion concentration was comparable to that resulting from the polymerization step performed five times in Example. The electrolytic oxidative polymerization step performed once gave a pH of about 10 to the electrolyte 51. This appears to indicate that the polypyrrole formed by the electrolytic oxidative polymerization was doped with alkylnaphthalenesulfonate ions, with the electrolyte 51 made alkaline with the remaining sodium ions.

When the completed solid electrolyte capacitors were checked for ESR, the average value was 61 milliohms, the maximum was 80 milliohms and the minimum was 50 milliohms.

c. Discussion

Comparison between Example of the invention and Comparative Example as to the measurements obtained indicates that Example showed the following effects.

The polypyrrole polymerized in an alkaline solution is generally lower in electric conductivity than that polymerized in an acid or neutral solution. The electrolyte used in Comparative Example for performing the electrolytic oxidative polymerization step only once becomes alkaline and therefore needs to be replaced before producing the subsequent lot of capacitor elements. In Example of the invention, on the other hand, the electrolyte remains acid or neutral even after it is used for performing the polymerization step several times, so that the electrolyte is usable repeatedly. This achieves an improved operation efficiency and a reduced cost in manufacturing capacitors.

Further a comparison between Example and Comparative Example as to the difference in ESR between the maximum and the minimum reveals that Example affords capacitors with more stabilized ESR characteristics than Comparative Example. Presumably this is attributable to the variations in the pH of the electrolytic oxidative polymerization system of Comparative Example, in contrast with Example wherein the electrolyte can be maintained at an optimum pH value.

Further according to Example, the electrolytic oxidative polymerization conducted reduces the alkylnaphthalenesulfonate ion concentration only slightly. This appears to indicate that the polypyrrole formed by the polymerization in Example does not associate with the supporting electrolyte but is doped mainly with sulfate ions. Accordingly inexpensive sulfuric acid is usable as the acid to be added to the electrolytic bath 51, and there is no need to add an acid containing the same anion as the supporting electrolyte (i.e., an alkylnaphthalenesulfonic acid in Example).

When further compared with Comparative Example in the average value of ESR, Example provides capacitors of more excellent ESR characteristics than Comparative Example. Since the polypyrrole formed by chemical oxidative polymerization and that formed by electrolytic oxidative polymerization are doped with the same agent, i.e., sulfate ion, it is thought that the same dopant serving for both the first cathode layer 3 and the second cathode layer 4 improved the cathode layers in electric conductivity.

Because the amount of the supporting electroltye doping the polypyrrole is very small, an electrolyte inappropriate as a dopant for the polypyrrole can be used as a supporting electrolyte.

For example, sodium alkylbenzenesulfonates are currently less expensive than sodium alkylnaphthalenesulfonates. However, the polypyrrole doped with the sodium alkylbenzenesulfonate has lower heat resistance than the polypyrrole doped with the sodium alkylnaphthalenesulfonate. For this reason, the sodium alkylnaphthalnesulfonate is solely used in the prior art as a supporting electrolyte rather than the sodium alkylbenzenesulfonate. According to Example, the sodium alkylbenzenesulfonate is usable as a supporting electrolyte in place of the sodium alkylnaphthalenesuflonate without resulting in impaired heat resistance since the polypyrrole is doped mainly with sulfate ions.

Polypyrrole is used for forming the cathode layers according to Example, whereas if polyaniline, for example, is to be used for the cathode layers, there arises a need to maintain the electrolyte at an acidity pH value of less than 7 in the electrolytic oxidative polymerization step since polyaniline is conductive only when polymerized in an acid solution. Thus the pH range in which the electrolyte must be maintained needs to be altered depending on the conductive high polymer to be formed and the dopant.

Embodiment 2

This embodiment relates to the step of forming by electrolytic oxidative polymerization the second cathode layer 4 as uniformly as possible on the first cathode layer 3. The treatment steps other than this electrolytic oxidative polymerization step are the same as in the first embodiment described.

Figure 5:
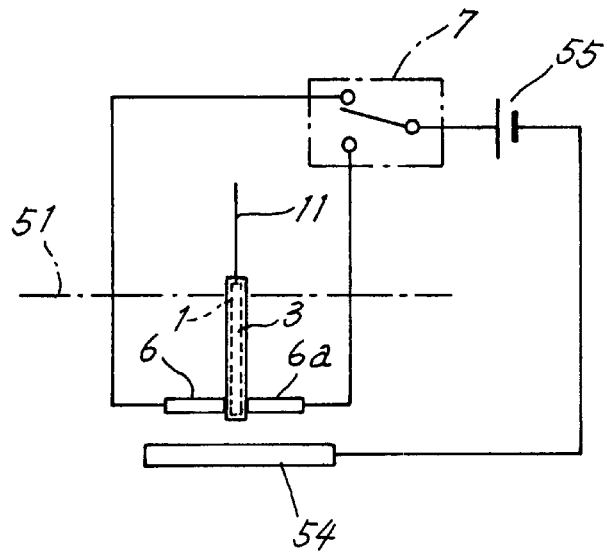
FIG. 5 is a front view showing another production apparatus according to the second embodiment.
Figure 6:
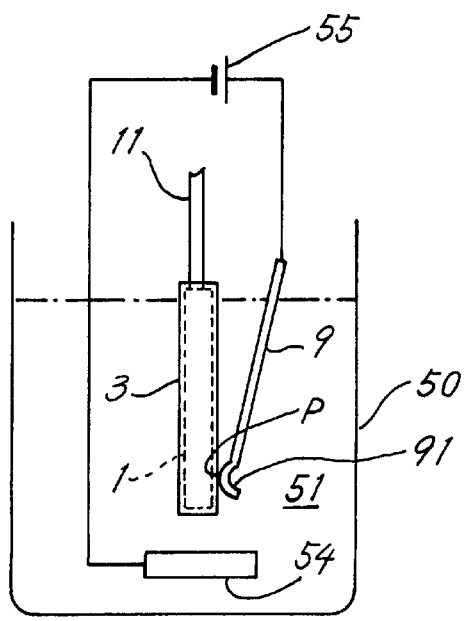
FIG. 6 is a front view of a conventional production apparatus.

FIGS. 3 to 5 show the main arrangement included in a production apparatus for forming the second cathode layer 4. This apparatus has the same construction as the conventional one shown in FIG. 6 except the external electrode (anode electrode) to be in contact with the anode body 1 and a device related to the electrode. The anode body 1 having a dielectric oxide film and a first cathode layer 3 over the surface of the body is supported in an electrolytic bath 50 and immersed in an electrolyte 51 which is an acetonitrile solution of tetraethyl-ammonium p-toluenesulfonic acid (0.05 mole/liter in concentration) and pyrrole monomer (0.1 mole/liter in concentration).

As shown in FIG. 3, the electrolytic bath 50 is provided with an anode electrode piece 6 which is movable into and out of contact with the anode body 1. The anode electrode piece 6 is connected to the positive electrode of a power source 55. As seen in FIG. 5, a cathode electrode 54 connected to the negative electrode of the power source 55 is disposed in the electrolyte 51.

The region of the first cathode layer 3 where the anode electrode piece 6 comes into contact with the layer 3 serves as a feeding point P, through which a current is fed to the first cathode layer 3 to form a second cathode layer 4 of polypyrrole on the first cathode layer 3 by electrolytic oxidative polymerization.

The anode electrode piece 6 is in the form of a resilient metal piece. Instead of vertical contact as shown in FIG. 3, the electrode piece 6 is preferably pressed sideways into contact with the anode body 1 under small pressure as shown in FIG. 4 by being elastically deformed. This ensures stabilized feeding to the first cathode layer 3 and diminishes mechanical impact on the layer 3, precluding damage to the first cathode layer 3 and the base layer therefor, i.e., the dielectric oxide film 2.

The anode electrode piece 6 is supported by a change-over device 7 on the electrolytic bath 50 so as to change the feeding point P on the anode body 1 within the bath 50. A known horizontal moving mechanism, pivotal mechanism, lift mechanism or any other mechanism is usable as the change-over device 7 for making the anode electrode piece 6 movable into and out of contact with the anode body 1. FIGS. 3 to 5 show some of such mechanisms.

FIG. 3 shows a pair of anode electrode pieces 6, 6a arranged at opposite sides of the anode body 1 and supported by the change-over device 7 so as to be horizontally movable at the same time toward or away from opposite sides of the anode body 1. When the electrode piece 6 is in contact with the left side of the anode body 1 for feeding, the second cathode layer 4 is formed, as centered about the feeding point P, to a greater thickness at the left side of the anode body 1 than at the right side thereof. When the change-over device 7 subsequently functions, the other electrode piece 6a comes into contact with the right side of the anode body 1 as seen in FIG. 3B, shifting the feeding point P to the right side of the anode body 1 to form the conductive high-polymer layer 4 to a greater thickness on the right side of the anode body 1. The change-over device 7 is actuated at a suitable time interval, e.g., at an interval of about 30 minutes to shift the feeding point P to opposite sides alternately, whereby the second cathode layer 4 is given a uniform thickness on the left and right sides of the anode body 1.

With reference to FIG. 4, the anode electrode piece 6 is upwardly and downwardly movably supported by a change-over device 7 to come into contact with a low portion and a high portion of the anode body 1 alternately to form a uniform cathode layer 4 over the entire length of the anode body 1. The feeding point P is made shiftable to the left and right sides of the anode body 1 and to upper and lower portions thereof by the embodiments of FIGS. 3 and 4 in combination.

With reference to FIG. 5, a pair of anode electrode pieces 6, 6a are arranged at opposite sides of the anode body 1 symmetrically and brought into contact with the anode body 1 at the same time, and feeding circuits connected to the power source 55 and provided for the respective electrode pieces are alternately changed over by a change-over device 7.

With the embodiment of FIGS. 3 and 5, the electrode pieces 6, 6a are repeatedly brought into and out of contact with the anode body 1, interfering with the formation of the second cathode layer 4 by contact at the feeding point P, while when moving out of contact with the anode body, the external electrode piece 6 locally separates the second cathode layer 4 from the surface of the first cathode layer 3. In the subsequent cycle, however, the electrode piece 6 moves, freeing the region of the previous feeding point on the first cathode layer 3 to freshly form or repair the second cathode layer. This also gives a uniform thickness to the second cathode layer 4, giving improved high-frequency characteristics to the solid electrolyte capacitors to be produced.

When the second cathode layer 4 is formed to a predetermined thickness, the anode electrode piece 6 is moved away from the anode body 1, the anode body 1 is taken out of the bath 50, washed and dried to complete a capacitor element 100. Solid electrolyte capacitor is thereafter completed by the same steps as previously described.

The foregoing description of embodiments is intended to illustrate the present invention and should not be construed as limiting the invention set forth in the appended claims or reducing the scope thereof. The process and apparatus of the invention are not limited to the embodiments but can of course be modified variously within the technical scope defined in the claims.

What is claimed is:

1. A process for producing a solid electrolyte capacitor including the steps of:

forming a dielectric oxide film on a surface of an anode body made of a valve metal, forming a first cathode layer of a solid electrically conductive substance on the oxide film, and forming a second cathode layer of an electrically conductive high polymer on the first cathode layer by electrolytic oxidative polymerization, the step of forming the second cathode layer including the step of maintaining the pH of an electrolyte for use in electrolytic oxidative polymerization at an acidity value of lower than 7 by adding an acid to the electrolyte.

2. A process for producing a solid electrolyte capacitor according to claim 1 wherein the anode body is a sintered body of the valve metal.

3. A process for producing a solid electrolyte capacitor according to claim 1 wherein the acid to be added to the electrolyte in the step of maintaining the pH of the electrolyte within a predetermined range is sulfuric acid.

4. A process for producing a solid electrolyte capacitor according to claim 1 wherein the step of forming the first cathode layer forms on the oxide film an electrically conductive high-polymer layer doped with a first dopant by chemical oxidative polymerization, the electrolyte for use in the step of forming the second cathode layer containing a supporting electrolyte giving a second dopant.

5. A process for producing a solid electrolyte capacitor according to claim 4 wherein the first cathode layer and the second cathode layer are each an electrically conductive high-polymer layer of polypyrrole, and the first and the second dopants comprise sulfate ion.

6. A process for producing a solid electrolyte capacitor according to claim 1 wherein the step of forming the second cathode layer is performed by:

immersing in the electrolyte the anode body formed over the surface thereof with the oxide film and the first cathode layer, feeding a positive voltage with an external electrode piece in contact with the first cathode layer over one of sides of the anode body in the electrolyte to form the second cathode layer of an electrically conductive high-polymer on the first cathode layer by electrolytic oxidative polymerization, then feeding a positive voltage with the external electrode piece in contact with the first cathode layer over other side of the anode body in the electrolyte to form the second cathode layer, and changing a feeding point of the external electrode piece on the first cathode layer alternatively at both sides of the anode body at a predetermined time interval to make the second cathode layer uniform in thickness on the cathode layer at both sides of the anode body.

7. A process for producing a solid electrolyte capacitor comprising:

immersing in an electrolyte an anode made of a valve metal and having a surface covered with a dielectric oxide film and a first cathode layer of solid electrically conductive substance, feeding a positive voltage with an external electrode piece in contact with the first cathode layer over one of the sides of the anode body in the electrolyte to form a second cathode layer of an electrically conductive high polymer on the first cathode layer by electrolytic oxidative polymerization, then feeding a positive voltage with the external electrode piece in contact with the first cathode layer over the other side of the anode body in the electrolyte to form the second cathode layer, and changing a feeding point of the external electrode piece on the first cathode layer alternatively at both sides of the anode body at a predetermined time interval to make the second cathode layer uniform in thickness on the cathode layer at both sides of the anode body.

\* \* \* \* \*